(12) United States Patent
Nishioka et al.

(10) Patent No.: US 9,702,980 B2
(45) Date of Patent: Jul. 11, 2017

(54) METHOD FOR REDUCING GPS RECEIVER POSITIONING TIME

(71) Applicant: LENOVO (SINGAPORE) PTE. LTD., Singapore (SG)

(72) Inventors: Yoshi Nishioka, Kanagawa-ken (JP); Takafumi Onodera, Kanagawa-ken (JP); Masahide Tamura, Kawasaki (JP)

(73) Assignee: LENOVO (SINGAPORE) PTE LTD, Singapore (DE)

( * ) Notice: Subject to any disclaimer, the term of this patent is extended or adjusted under 35 U.S.C. 154(b) by 461 days.

(21) Appl. No.: 14/506,161

(22) Filed: Oct. 3, 2014

(65) Prior Publication Data
US 2015/0097725 A1  Apr. 9, 2015

(30) Foreign Application Priority Data
Oct. 3, 2013 (JP) .................... 2013-207995

(51) Int. Cl.
| | | |
|---|---|---|
| G01S 19/24 | (2010.01) | |
| G01S 19/34 | (2010.01) | |
| G01S 19/25 | (2010.01) | |
| G01S 19/27 | (2010.01) | |
| G01S 19/21 | (2010.01) | |

(52) U.S. Cl.
CPC .............. *G01S 19/24* (2013.01); *G01S 19/34* (2013.01); *G01S 19/21* (2013.01); *G01S 19/258* (2013.01); *G01S 19/27* (2013.01)

(58) Field of Classification Search
CPC ........ G01S 19/24; G01S 19/258; G01S 19/27; G01S 19/25; G01S 19/34

USPC ........... 342/357.51, 357.52, 357.64, 357.66, 342/357.63, 357.74
See application file for complete search history.

(56) References Cited

U.S. PATENT DOCUMENTS

| | | | | |
|---|---|---|---|---|
| 8,823,587 | B2 * | 9/2014 | Abraham ................ | G01S 19/27 342/357.66 |
| 8,854,259 | B2 * | 10/2014 | van Diggelen ......... | G01S 19/34 342/357.25 |
| 9,066,295 | B2 * | 6/2015 | Moeglein .......... | H04W 52/0229 |
| 9,322,925 | B2 * | 4/2016 | Babitch ................... | G01S 19/34 |

(Continued)

FOREIGN PATENT DOCUMENTS

| | | |
|---|---|---|
| CN | 101097252 A | 1/2008 |
| CN | 101738596 A | 6/2010 |

(Continued)

OTHER PUBLICATIONS

Agilent Technologies, "GPS Receiver Testing", Agilent Technologies, Inc. 2010, Printed in USA, Jan. 4, 2010.

*Primary Examiner* — Chuong P Nguyen
(74) *Attorney, Agent, or Firm* — Antony P. Ng; Russell Ng PLLC (57) ABSTRACT

A method for reducing the positioning time of a GPS receiver is disclosed. In response to a request from a user function for positioning data, a GPS management section instructs a device control section to lower the functions of a group of components. The lowering of the functions of the components reduces the noise level. The GPS management section operates the GPS receiver. The GPS receiver executes an acquisition process in an environment with a low noise level. After completion of the acquisition process, the functions of the component are restored.

9 Claims, 3 Drawing Sheets

(56) References Cited

U.S. PATENT DOCUMENTS

| | | | |
|---|---|---|---|
| 2008/0117103 A1* | 5/2008 | Wang | G01S 19/34 |
| | | | 342/357.74 |
| 2009/0322606 A1* | 12/2009 | Gronemeyer | G01R 19/16542 |
| | | | 342/357.62 |

FOREIGN PATENT DOCUMENTS

| | | |
|---|---|---|
| JP | 2000-111648 | 4/2000 |
| JP | 2002-335278 | 11/2002 |
| JP | 2003-318915 | 11/2003 |
| JP | 2004-061336 | 2/2004 |
| JP | 2009-049909 | 3/2009 |
| JP | 2009-288017 | 12/2009 |
| JP | 2010-038895 | 2/2010 |
| JP | 2010-230309 | 10/2010 |
| JP | 2011-220945 | 11/2011 |
| JP | 2012-103223 | 5/2012 |
| JP | 2013-120131 | 6/2013 |

* cited by examiner

| | VOLTAGE CONTROL | FREQUENCY CONTROL | STOP/LIMIT | TRANSMISSION LIMIT | RECEPTION LIMIT | WRITING LIMIT | READING LIMIT |
|---|---|---|---|---|---|---|---|
| CPU CORE | 1 | 1 | | | | | |
| VIDEO | 1 | 1 | 1 | | | | |
| LCD | 1 | | 3 | | | | |
| SYSTEM MEMORY | | | 3 | | | | |
| WWAN | | | | 2 | 2 | | |
| WLAN | | | | 2 | 3 | | |
| SSD | | | | | | 2 | 3 |
| CHG | | | 1 | | | | |
| AUDIO | | | 2 | | | | |

METHOD FOR REDUCING GPS RECEIVER POSITIONING TIME

PRIORITY CLAIM

The present application claims benefit of priority under 35 U.S.C. §§120, 365 to the previously filed Japanese Patent Application No. JP2013-207995 with a priority date of Oct. 3, 2013, which is incorporated by reference herein.

BACKGROUND OF THE INVENTION

1. Technical Field

The present invention relates to Global Positioning Systems in general, and particularly to a method for reducing positioning time of a Global Positioning System receiver.

2. Description of Related Art

Portable electronic devices, such as laptop personal computers (laptop PCs), tablet computers, smartphones, etc., are commonly equipped with a Global Positioning System (GPS) receiver. The GPS receiver analyzes navigation data carrying radio waves of an L1 wave (1,575.42 MHz) and an L2 wave (1,227.60 MHz) transmitted from GPS satellites for calculating the latitude and longitude thereof.

The navigation data are composed of 25 frames including ephemeris data indicative of precise orbit information on each individual satellite, almanac data indicative of coarse orbit information on all traveling GPS satellites, correction data for a satellite 3D clock, ionosphere correction data, and the like. The almanac data have a lot of information and hence is divided and contained in the 25 frames. Since the number of bits of each frame is 1,500 bits and the data rate of a navigation message is 50 bits per second (bps), the GPS receiver requires 30 seconds to receive one frame, requiring 12.5 minutes to receive the entire navigation data.

When the GPS receiver is powered on, the GPS receiver performs positioning through processes called acquisition and tracking. During the acquisition process, four or more GPS satellites capable of being used for positioning are searched for to acquire each set of ephemeris data. The more the acquired GPS satellites, the more the positioning accuracy is improved. During the tracking process, the distance to each of the to acquired GPS satellites is calculated from the navigation data received from the GPS satellites to perform positioning by triangulation based on the position of each GPS satellite.

The life of ephemeris data is approximately 2 hours and the life of almanac data is approximately 24 hours. The ephemeris data and the almanac data held by the GPS satellites are updated by a ground control station periodically. The GPS receiver internally stores the received navigation data for use in the next acquisition process so that positioning can be performed in a short time. However, if the operation stopping time becomes longer, the life of the above-mentioned data may expire from being used for subsequent positioning.

Starting positioning in a state that the GPS receiver already has effective ephemeris data and almanac data is called a hot start. Starting positioning in a state that the GPS receiver has only effective almanac data is called a warm start. Starting positioning in a state that the GPS receiver has neither effective ephemeris data nor almanac data is called a cold start.

A cold start requires a few minutes to receive almanac data in the acquisition process even when various algorithms are introduced. During the acquisition process, when a bit error occurs and hence the navigation data are fragmented, the navigation data need to be received again. A warm start requires 30 to 40 seconds to receive each frame of ephemeris data from the four or more GPS satellites in parallel during the acquisition process, and if an error occurs along the way, the other frames transmitted by the GPS satellites will need to be fully received again. There is a technique called an assist-type GPS, in which a radio base station or a network server periodically supplies the GPS receiver with ephemeris data and almanac data acquired from GPS satellites.

There exists a prior art technique for accurately measuring only the noise level of an ambient environment to determine a threshold value level in order to improve the acquisition accuracy of a received GPS signal. A GPS receiver is started a predetermined time after the start of on-board equipment. Since the GPS receiver measures noise only from the ambient environment without noise transiently radiated during start-up of the on-board equipment, and compares the set threshold value with an output signal from a correlator, a situation that the threshold value level becomes unstable such as to rise or fall unusually to disable the calculation of an accurate position is prevented. These acquisition sensitivity level is required to be higher than the tracking sensitivity level.

The GPS radio waves are a faint signal and the signal level is lower than a noise level in an environment where the GPS receiver exists. In one example, although a signal level in the position of a GPS antenna is about −120 dBm to −165 dBm, the noise level in the GPS receiver reaches −100 dBm. In the acquisition process during the cold start and the warm start, when a bit error occurs while a frame is being received, since the frame needs to be received again, it is necessary to keep the noise level of an ambient environment to the GPS receiver as low as possible in order to complete the acquisition process in the shortest time. On the other hand, since positioning can be performed in the tracking process even when time information is acquired in fragments, there is no need to fully receive the entire frame, resulting in higher noise tolerance than that in the acquisition process.

As an example, more than ten to twenty times the signal level is required in the acquisition process compared with the tracking process. A certain type of GPS receiver requires a signal level of about −140 dBm in the acquisition process and a signal level of about −160 dBm in the tracking process. When the GPS receiver is operated in an environment with a high noise level, positioning may be disabled because the acquisition process cannot be completed. Especially, noise from various devices can easily enter a GPS receiver stored in portable electronic devices.

The assist-type GPS cannot be used in an environment where no wireless network can be used, and the cost of communication for acquiring navigation data is also required. Further, even if ephemeris data and almanac data are received from the network, since there is a need to receive navigation, data from GPS satellites in the end, it is better even for the assist-type GPS to operate in an environment with a low noise level so that the acquisition process can be completed in a short time.

Consequently, it would be preferable to provide an improved method for reducing the positioning time of a GPS receiver within a noisy environment.

SUMMARY OF THE INVENTION

In accordance with a preferred embodiment of the present invention, a method for reducing positioning time of a GPS receiver within an electronic device includes categorizing electronic components within an electronic device into a first group and a second group. In response to a request for positioning information, a determination is made whether or not an operation of the GPS receiver begins from a hot start in which ephemeris data and almanac data are retained. If the operation of the GPS receiver does not begins from a hot start, functions of the first group of electronic components are lowered, and a GPS positioning process is initiated via the GPS receiver. If the GPS positioning process cannot be completed within a predetermined time, the functions of the second group of electronic components are lowered, and the GPS positioning process is continued via the UPS receiver. Finally, the corresponding positioning information are produced by the GPS receiver.

The positioning can be performed in two stages, namely, an acquisition stage and a tracking stage. Since the tracking stage has a higher noise tolerance than that of the acquisition process, the function of the electronic device can be restored after the completion of the acquisition process.

The voltage or operating frequency of the electronic device can be reduced to lower the noise level around the GPS receiver while securing the operation of the electronic device. When the GPS receiver begins with a hot start in which the GPS receiver starts operating in a state of retaining ephemeris data and almanac data, the positioning can be completed in a relatively short time even when ambient noise level is high.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
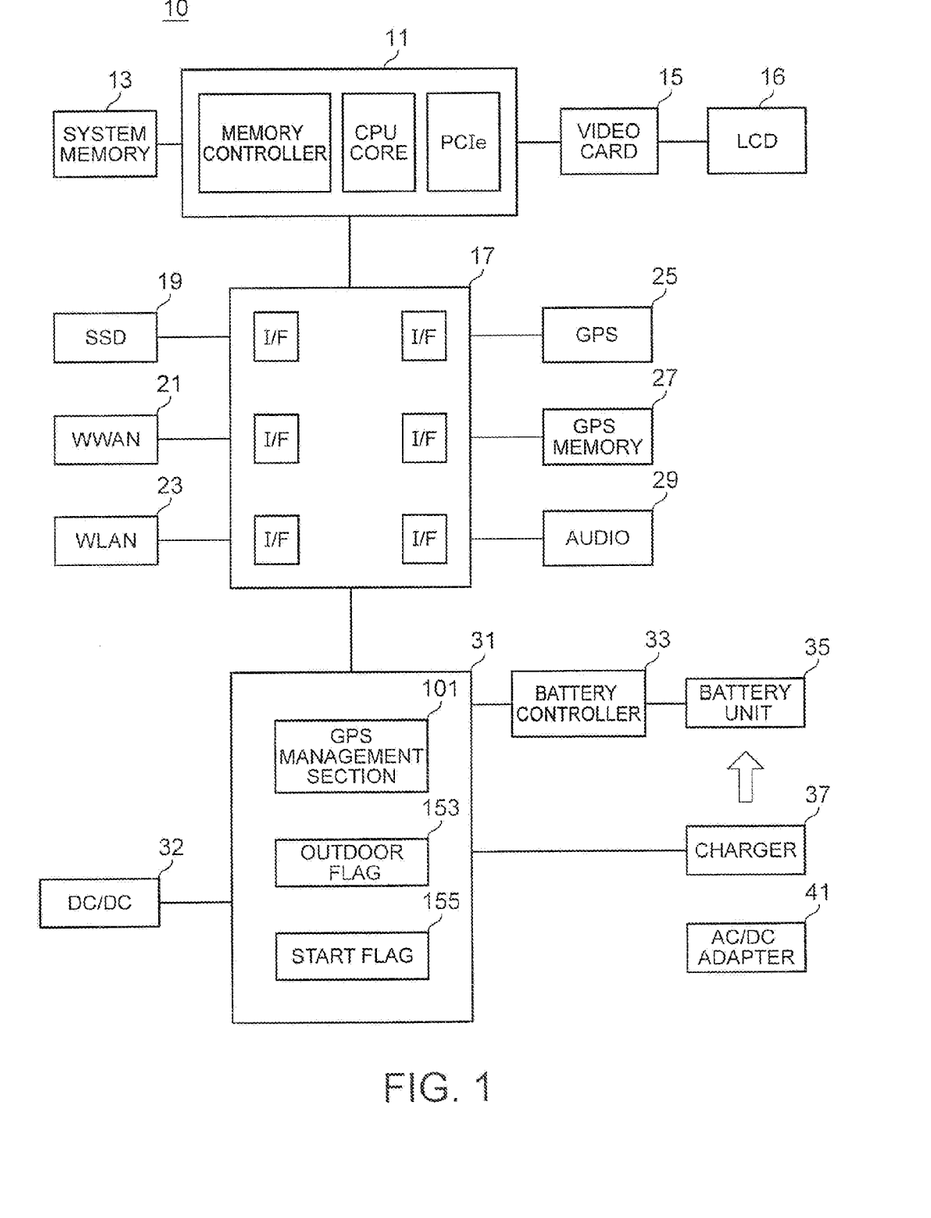
FIG. 1 is a functional block diagram of a portable electronic device having a GPS receiver.

FIG. 1 is a functional block diagram of a portable electronic device 10. As shown, a CPU 11, an SSD 19, a wireless WAN module 21, a wireless LAN module 23, a GPS receiver 25, a GPS memory 27, an audio device 29, and an embedded controller (EC) 31 are illustratively connected to a chipset 17. The CPU 11 includes a memory controller and a PCI Express (PCIe) controller in addition to a CPU core.

A volatile system memory 13 and a video card 15 are connected to the CPU 11. The CPU 11 can dynamically control voltage and an internal clock at the same time or individually for the purposes of reducing power consumption and preventing a rise in temperature. To enable such control, a technology called the Intel® SpeedStep or AMD® Cool'n'Quiet can be employed for the CPU 11 as an example.

The video card 15 mounts a GPU, a TRAM, a backlight control logic, and the like thereon, and an LCD 16 is connected to the video card 15. The chipset 17 includes interface controllers of various standards to connect peripheral devices. For example, the following types of interfaces can be employed: SATA for the SSD 19, PCIe for the wireless WAN module 21 and the wireless LAN module 23, Universal Asynchronous Receiver Transmitter (UART) for the GPS receiver 25, Serial Peripheral Interface (SPI) for the GPS memory 27 and the EC 31, HDMI® for the audio device 29 such as a microphone and a speaker. However, the types of interfaces do not need to be limited to those illustrated here.

The SSD 19 is a large-capacity storage device (disk drive) for storing an OS, device drivers, application programs, user data, and the like. The SSD 19 stores a program for configuring a device control section 109 and a function setting section 105 of a GPS control system 100 to be described with reference to FIG. 2, and a reference table 107. When starting operation, the GPS receiver 25 measures the current position from navigation data received from GPS satellites, and provides a requesting application program with positioning data including the longitude and latitude.

The GPS receiver 25 may be of the assist-type that can receive navigation data including ephemeris data and almanac data periodically from a network server or a wireless WAN base station. When starting operation, the GPS receiver 25 executes an acquisition process and then executes a tracking process to output positioning data. When the acquisition process cannot be completed, the acquisition process is continued until the operation is stopped. Although the GPS receiver 25 holds the navigation data even when the positioning is completed and the operation is stopped, the navigation data will become unavailable once the life of the navigation data has expired.

The GPS memory 27 is a volatile memory that functions as a buffer memory for temporarily storing send data generated while the transmission of the wireless WAN module 21 or the wireless LAN module 23 is being stopped to perform function control in order to reduce the noise level to be described later. The GPS memory 27 also functions as a buffer memory for temporarily storing write data generated while writing to the SSD 19 is being limited.

The EC 31 is a microcomputer composed of a processor, a memory, a ROM for storing firmware, and the like. The EC 31 operates independently of the CPU 11 to control the temperature and power of the portable electronic device 10. A battery controller 33, a charger 37, and a DC/DC converter 32 are connected to the EC 31. The battery controller 33 is a microcontroller for calculating the remaining capacity of a battery cell and controlling safety during charging and recharging. A battery unit 35 including a lithium-ion battery cell, a protection circuit, and the like is connected to the battery controller 33. An AC/DC adapter 41 supplies power to the charger 37 and the DC/DC converter 32.

The EC 31 receives information on the charging state of the battery unit 35 from the battery controller 33 to control the operation of the charger 37. When the source of power is the battery unit 35, the portable electronic device 10 can perform a power saving operation for reducing power consumption more than when the source of power is the AC/DC adapter 41. The EC 31 and the chipset 17 can follow a power saving profile set via the OS to control the operation of each device and the DC/DC converter 32 based on the power saving profile set when the source of power is changed to the battery unit 35. The EC 31 also performs function control to reduce the noise level as part of the device control section 109 shown in FIG. 2.

Figure 2:
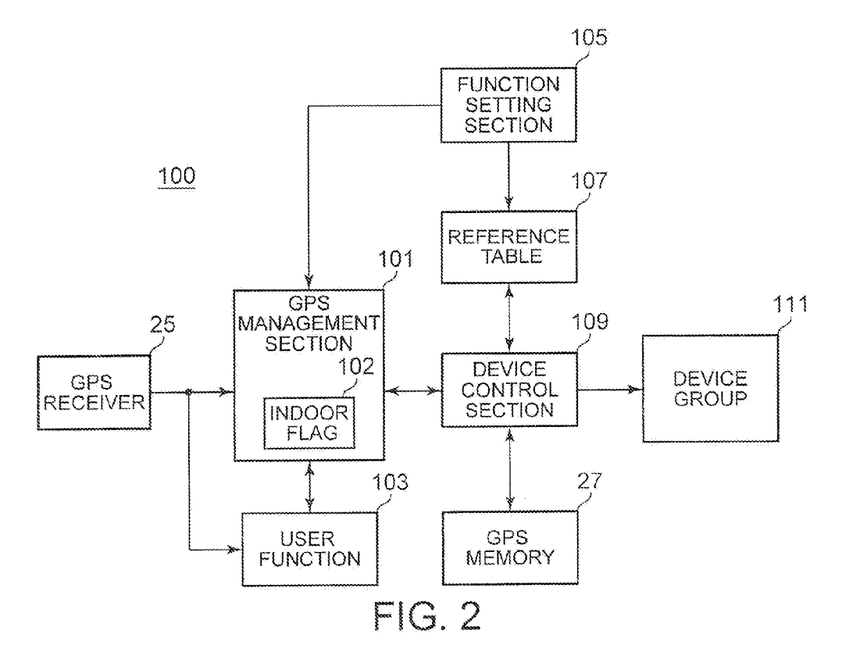
FIG. 2 is a functional block diagram of a GPS control system within the portable electronic device from FIG. 1.

A GPS management section 101 to be described with reference to FIG. 2 is configured in the EC 31 by firmware, and the EC 31 further includes a register for setting an outdoor flag 153 and a start flag 155. The outdoor flag 153 is set by a user when there is a need to perform function control in the acquisition process only in a case where the portable electronic device 10 is present outdoors. The start flag 155 is set by the user when there is a need to perform function control in the acquisition process only in a case where it is estimated that the GPS receiver 25 has started in a warm start or cold start mode. The outdoor flag 153 and the start flag 155 can be set via the function setting section 105 (FIG. 2).

FIG. 2 is a functional block diagram of the GPS control system 100. The GPS management section 101 receives a request event for requesting positioning data from a user function 103 to operate the GPS receiver 25, and receives a stop event from the user function 103 to stop the operation of the GPS receiver 25. The GPS management section 101 can send a control event to the device control section 109 to perform function control before operating the GPS receiver 25. Alternatively, the GPS management section 101 can send the control event to the device control section 109 when positioning is not completed within a predetermined time after operating the GPS receiver 25. The GPS management section 101 can divide the control event into a phase 1 to a phase 3, and send them in a stepwise fashion.

When receiving positioning data from the GPS receiver 25, the UPS management section 101 can determine the completion of the acquisition process, and send the device control section 109 a cancel event to stop the function control. The cancel event may be sent when the first positioning data is received, or when a few pieces of positioning data are received. The output of the positioning data from the GPS receiver 25 is an example of determining the completion of the acquisition process, and the GPS management section 101 can also send the cancel event using other various pieces of information indicating that the GPS receiver 25 has completed the acquisition process and made a transition to the tracking process.

The GPS management section 101 measures the time that has elapsed since the GPS receiver 25 operated to start the acquisition process, and when not receiving positioning data even after a predetermined time has elapsed, the GPS management section 101 can send the device control section 109 high-order phases of control event in order. Since the radio waves radiated from the GPS satellites are weak, positioning cannot often be performed indoors even if the GPS receiver 25 is operated. In the meantime, there is an application program among the application programs, which acquires current position information once being started, and reports weather information and information on an ambient environment periodically in push communication.

When such an application program is started, a request event and a stop event are issued periodically while the portable electronic device 10 is in operation to repeat the operation of the GPS receiver 25 and the stop of the operation. It is not, preferred in terms of usability that function control be performed frequently even when the portable electronic device 10 is present indoors, such as in the subway or a building, where GPS cannot be used. Therefore, the GPS management section 101 can avoid performing function control when the GPS radio waves are weak and it is highly possible that the GPS receiver 25 cannot perform positioning.

To this end, the GPS management section 101 determines whether the portable electronic device 10 is indoors or outdoors at present. For example, the GPS management section 101 acquires the MAC address of an access point, to which the wireless LAN module 21 is connected, periodically from the user function 103, and when the wireless LAN module 21 is connected to an indoor access point registered in advance, the GPS management section 101 can determine that the portable electronic device 10 is present indoors, while when it is not connected to any of registered indoor access points, the GPS management section 101 can determine that the portable electronic device 10 is present outdoors.

Suppose that such a system to switch the connection automatically from the wireless WAN to the wireless LAN when a wireless LAN network is detected is employed. In this case, if the wireless LAN module 23 is connected, it can be determined that the portable electronic device 10 is present indoors. The GPS management section 101 can also use position information provided from a wireless WAN base station to determine whether the portable electronic device 10 is indoors or outdoors. The GPS management section 101 can further cause the GPS receiver to perform positioning periodically to monitor the states of the GPS radio waves in order to determine that the portable electronic device 10 is present indoors when positioning cannot be performed.

In the case of portable electronic device using the AC/DC adapter 41 as the source of power in indoor places, the GPS management section 101 can determine that the portable electronic device is being used indoors when the source of power is the AC/DC adapter 41. If determining that the portable electronic device 10 is indoors at present as a result of gathering these various pieces of information even when the outdoor flag 153 is set, the GPS management section 101 can set an indoor flag 102 in the register not to send a control event even if receiving a request event from the user function 103.

The GPS management section 101 can measure the stop time from when the GPS receiver 25 stopped last time until a request event is received this time to estimate the validity of ephemeris data held by the GPS receiver 25. If estimating that the positioning operation this time is a hot start when the start flag 155 is set, the GPS management section 101 can operate the GPS receiver 25 without sending the control event even if receiving the request event from the user function 103.

The user function 103 is composed of multiple functional blocks, where hardware such as the CPU 11 and the system memory 13 shown in FIG. 1 cooperates with software such as the OS and an application program. The user function 103 can include a functional block composed of a map using positioning data from each GPS, a neighboring information retrieval service or an application program such as SNS, and the like. The user function 103 can also include a functional block composed of a device driver for the wireless WAN module 21 or the wireless LAN module 23 to determine whether the location of the equipment is indoors or outdoors. When any of the functional blocks outputs a request event, the GPS receiver 25 is operated, while when all functional blocks that have output the request event output a stop event, the GPS receiver 25 is stopped.

The device control section 109 is composed of functions for which hardware, such as the CPU 11, the system memory 13, the chipset 17, and the EC 31, cooperates with software such as the OS and the device drivers. When receiving the control event from the GPS management section 101, the device control section 109 refers to the reference table 107 to control the functions of a device group 111 in order to reduce the level of noise to the GPS receiver 25.

Figure 3:
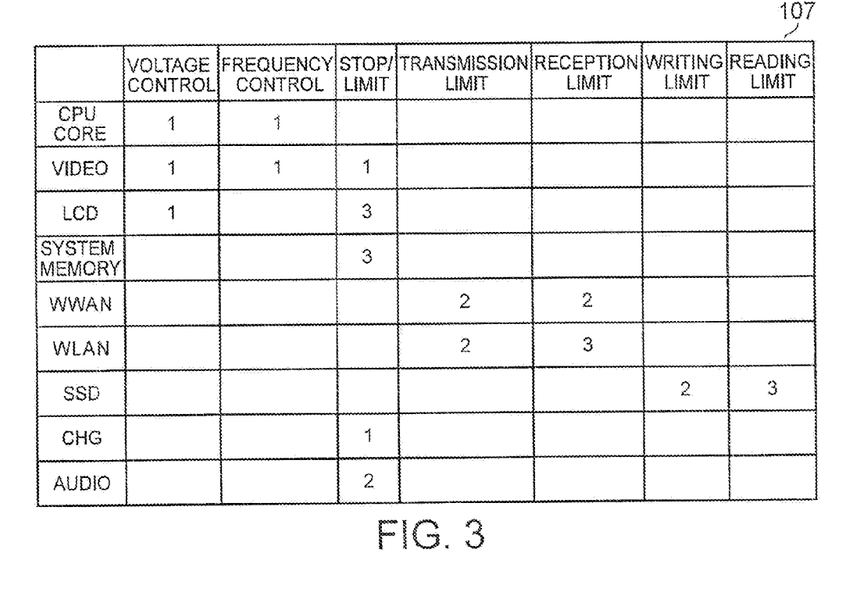
FIG. 3 is a table showing a data structure of a reference table for setting a function control profile.

The device control section 109 returns, to the original state, a device on which function control has been performed when receiving a cancel event from the UPS management section 101. FIG. 3 is a table showing an example of the data structure of the reference table 107 for setting a function control profile. In the reference table 107, group numbers 1 to 3 are set for pairs of devices to be subjected to function control and control items. The group numbers correspond to the phases of the control event output from the GPS management section 101.

On the pairs of devices and control items, for which the same group number is set, function control is performed simultaneously when a corresponding phase of the control event is issued. The core of the CPU 11 and the CPU of the video card 15 reduce voltage and an operation clock when the phase 1 of the control event is issued, respectively. In response to the phase 1 of the control event, the CPU can further stop a function requiring large load such as rendering for replaying video. The LCD 17 lowers the brightness of a backlight according to the phase 1 of the control event, and stops the operation of the LCD 17 according to the phase 3 of the control event.

The system memory 13 limits access to a memory space used by a program execution process predefined according to the phase 3 of the control event. As the process of limiting access, a process having little impact on the operation of the computer is selected from among programs running in a user mode. The wireless WAN module 21 stops the transmission operation and the reception operation according to the phase 2 of the control event. The wireless LAN module 23 stops the transmission operation according to the phase 1 of the control event, and further stops the reception operation according to the phase 3 of the control event.

The SSD 19 limits writing according to the phase 2 of the control event, and further limits reading according to the phase 3 of the control event. The charger 37 stops operating according to the phase 1 of the control event. The audio device 29 stops operating according to the phase 2 of the control event. The group numbers in the reference table 107 can be set by the user via the function setting section 105.

When transmission from the wireless WAN module 21 or the wireless LAN module 23 is limited according to the control event and when writing to the SSD 19 is limited, the device control section 109 can temporarily store, in the GPS memory 27, send data and write data output from the user function 103 during that time, and send the data to each device upon receipt of the cancel event. Since each pair of a device and a control item in a group 1 has a high power-saving effect with relatively less degradation of usability in the control table 107, the pair can be matched to the power saving profile.

Figure 4:
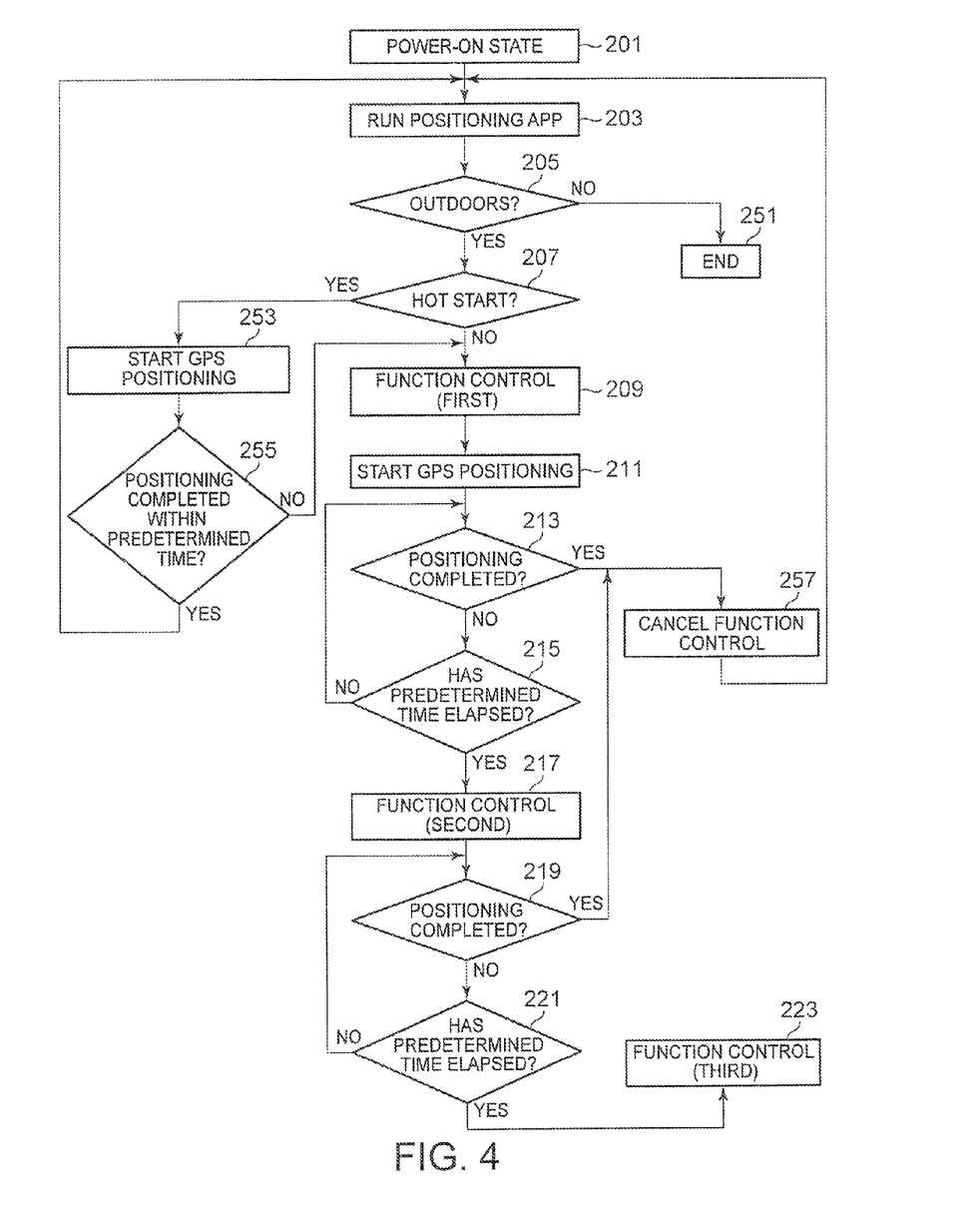
FIG. 4 is a flowchart of a method for reducing the positioning time of the GPS receiver within the portable electronic device from FIG. 1.

FIG. 4 is a flowchart describing an operational procedure when the GPS control system 100 performs function control in conjunction with the operation of the GPS receiver 25. In block 201, the portable electronic device 10 operates in a power-on state and the GPS receiver 25 is stopped. In block 203, a functional block of the use function 103 sends a request event to the GPS management section 101 to acquire positioning data from the GPS receiver 25. Note that a certain type of user function 103 may frequently send a request event in places, such as the subway and a building, where radio waves from UPS satellites do not reach.

When there is a request event, the function of the portable electronic device 10 is lowered for a predetermined amount of time. However, when the portable electronic device 10 is present in a place where radio waves from GPS satellites do not reach, positioning cannot be performed even if the GPS receiver 25 is operated. ID such a case, if function control is performed, the advantage of reducing the positioning time as a trade-off with the lowering of the function cannot be obtained. When the outdoor flag 153 is set, the procedure proceeds to block 205; otherwise, when the outdoor flag 153 is not set, the procedure skips block 205 and proceeds to block 207.

In block 205, when the indoor flag 102 is set, the GPS management section 101 concludes that the portable electronic device 10 is present indoors and the procedure proceeds to block 251; otherwise, when the indoor flag 102 is not set, the GPS management section 101 concludes that the portable electronic device 10 is present outdoors and the procedure proceeds to block 207. In block 251, function control is not performed to perform processing by a conventional method without applying the present invention. Thus, when the portable electronic device 10 is in the subway or a building, function control is not performed, and the GPS receiver 25 continues the acquisition process but cannot perform positioning.

The user function 103 that cannot acquire positioning data detects time out, and displays the state on the LCD 16 and outputs the stop event. Since block 205 is directed not to perform function control that is ineffective when it is highly possible that the GPS receiver 25 cannot perform positioning, the signal level of C/A code included in navigation data can be directly detected to determine whether or not to perform function control of the present invention.

In block 207, from the stop time after positioning data were received last time, the GPS management section 101 determines whether the operation of the UPS receiver 25 this time is a hot start holding ephemeris data and almanac data (or a warm start or a cold start other than the hot start). When the hot start is detected, the procedure proceeds to block 253 to operate the GPS receiver 25.

When it is concluded that the life of ephemeris data has expired due to a long stop time, the procedure proceeds to block 209. The GPS receiver 25 starts operating, and when holding ephemeris data, the GPS receiver 25 receives navigation data from a GPS satellite desired to perform positioning. Then, if the ephemeris data is valid, the first positioning will be ended in an extremely short time.

In block 255, when not being able to receive the first positioning data within a predetermined time until positioning assumed at the time of the hot start after operating the GPS receiver 23, the GPS management section 101 proceeds to block 209 to start function control. When receiving the first positioning data within the predetermined time, the procedure returns to block 203 in which the GPS receiver 25 that made a transition to the tracking process continues to send positioning data periodically to the user function 103 and the GPS management section 101 until the user function 103 sends the stop event to the GPS management section 101.

In block 209, the GPS management section 101 sends the phase 1 of the control event to the device control section 109. The device control section 101 refers to the function control profile set in the reference table 107 to control the functions of devices in the group 1 according to the control items. After receiving a notification of completion of the phase 1 of the function control from the device control section 109, the GPS management section 101 operates the GPS receiver 25 to start positioning in block 211, and measures the time until receiving the first positioning data in block 215. The GPS receiver 25 starts the acquisition process in an environment where the phase 1 of the function control is performed to reduce the noise level of the portable electronic device 10.

When not being able to receive the first positioning data within the predetermined time from the GPS receiver 25, the GPS management section 101 proceeds to block 217. After receiving the first positioning data within the predetermined time, the GPS management section 101 proceeds to block 257. In block 257, the GPS management section 101 sends a cancel event to the device control section 109. The device control section 109 that received the cancel event restores the functions of devices in the group 1, and returns to block 203. After that, since the GPS receiver 25 makes a transition to the tracking process, periodical positioning can be continued even if the noise level is high.

In block 217, the GPS management section 101 sends the phase 2 of the control event to the device control section 109. The device control section 109 that received the phase 2 of the control event further lowers the functions of devices in a group 2 in addition to the phase 1 of the function control. As a result, the noise level of the portable electronic device 10 is further reduced. After receiving the first positioning data within the predetermined time from the GPS receiver 25 in block 219, the GPS management section 101 proceeds to block 257.

At this time, when send data from the wireless WAN module 21 and the wireless LAN module 23 or write data to the SSD 19 are stored in the GPS memory 27, the device control section 109 sends these pieces of data to each device. Each device that received the data automatically processes the data. In block 257, the device control section 109 returns, to the original state, each device the function of which has been lowered by the phase 1 and phase 2 of the control event.

When no positioning data are received after the predetermined time has elapsed, the procedure proceeds to block 223 in which the GPS management section 101 sends the phase 3 of the control event to the device control section 109. The device control section 109 lowers the functions of devices in a group 3 in addition to the phase 2 of the function control. As a result, the noise level of the portable electronic device 10 becomes the lowest level. Note that, when no positioning data are received within the predetermined time even if after the phase 3 of the control event has been sent, the GPS management section 101 sends the cancel event to the device control section 109.

The procedure of FIG. 4 proceeds from block 205 to block 209 when the start flag 155 is not set. Assuming that the GPS receiver 25 starts in the warm start or cold start mode, this procedure can complete positioning in a short time. When the user function 103 repeatedly issues the request event and the stop event frequently at short time intervals, it is highly possible that the GPS receiver 25 is in the hot start mode. In such a case, the positioning time can be reduced while reducing the frequency of function control with the assumption that the GPS receiver 25 hot starts.

When the start flag 155 is not set for that purpose, such a procedure that proceeds from block 205 directly to block 253, and to block 209 via block 255 can be employed. In this procedure, when there is the request event, the GPS management section 101 operates the GPS receiver 25 without performing function control. If the GPS receiver 25 holds ephemeris data, the GPS receiver 25 can generate first positioning data in a short time without performing function control and make a transition to the tracking process. Then, if the function control is performed only when the positioning data is not generated in a short time expected at the time of the hot start, the positioning time can be reduced without performing the function control each case the possibility of the hot start is high.

As has been described, the present disclosure provides a method for reducing the positioning time of a GPS receiver within a noisy environment.

The present invention is not limited to portable electronic devices, such as laptop computers, tablet terminals, cellular phones, or smartphones. The present invention can be applied to portable type electronic devices equipped with a positioning system such as an in-car navigation system or a portable positioning device. The present invention is also not limited to a case where the GPS receiver 25 and an electronic device to be subjected to function control are housed in the same chassis, and the present invention can also be applied to a case where the GPS receiver 25 is placed in a position close enough to be affected by noise from electronic devices.

While the disclosure has been particularly shown and described with reference to a preferred embodiment, it will be understood by those skilled in the art that various changes in form and detail may be made therein without departing from the spirit and scope of the disclosure.

What is claimed is:

1. A method for reducing positioning time of a GPS receiver within an electronic device, said method comprising:
    categorizing electronic components within said electronic device into a first group and a second group;
    in response to a request for positioning information, determining whether or not an operation of said GPS receiver begins from a hot start in which ephemeris data and almanac data are retained;
    in a determination that said operation of said GPS receiver does not begin from a hot start, lowering functions of said first group of electronic components and initiating a GPS positioning process via said GPS receiver;
    in response to said GPS positioning process not being completed within a predetermined time, lowering functions of said second group of electronic components and continuing said GPS positioning process via said GPS receiver; and
    producing corresponding positioning information by said GPS receiver.

2. The method of claim 1, further comprising restoring said functions of said electronic components after said corresponding positioning information have been produced by said GPS receiver.

3. The method of claim 1, wherein said lowering functions include reducing voltage of said electronic components.

4. The method of claim 1, wherein said lowering functions include reducing operating frequencies of said electronic components.

5. The method of claim 1, further comprising in a determination that said operation of said GPS receiver begins from a hot start, initiating GPS positioning via said GPS receiver immediately.

6. The method of claim 5, further comprising in response to said GPS positioning process not being completed within a first predetermined time, lowering functions of said first group of electronic components and continuing said GPS positioning process via said GPS receiver.

7. The method of claim 6, further comprising in response to said GPS positioning process not being completed within a second predetermined time, lowering functions of said second group of electronic components and continuing said GPS positioning process via said GPS receiver.

8. The method of claim 1, further comprising
determining whether or not said electronic device is located indoors;
in a determination that said electronic device is located indoors, stopping said request and said GPS positioning process.

9. The method of claim 1, further comprising
categorizing electronic components within said electronic device into said first group, said second group and a third group; and
in response to said GPS positioning process not being completed within an additional predetermined time, lowering functions of third group of electronic components and continuing said GPS positioning process via said GPS receiver.

* * * * *

UNITED STATES PATENT AND TRADEMARK OFFICE
CERTIFICATE OF CORRECTION

PATENT NO. : 9,702,980 B2  
APPLICATION NO. : 14/506161  
DATED : July 11, 2017  
INVENTOR(S) : Yoshi Nishioka, Takafumi Onodera and Masahide Tamura Page 1 of 1

It is certified that error appears in the above-identified patent and that said Letters Patent is hereby corrected as shown below:

On the Title Page

In (72) Inventors listing, please replace "Yoshi" with --Yoshio--

Signed and Sealed this  
Third Day of March, 2020

Andrei Iancu  
*Director of the United States Patent and Trademark Office*